United States Patent
Shi et al.

(10) Patent No.: US 8,010,170 B2
(45) Date of Patent: Aug. 30, 2011

(54) BATTERY COVER LATCH MECHANISM AND PORTABLE ELECTRONIC DEVICE USING SAME

(75) Inventors: Zheng Shi, Shenzhen (CN); Chih-Chiang Chang, Taipei Hsien (TW)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 374 days.

(21) Appl. No.: 12/235,716

(22) Filed: Sep. 23, 2008

(65) Prior Publication Data

US 2009/0262506 A1    Oct. 22, 2009

(30) Foreign Application Priority Data

Apr. 22, 2008    (CN) .......................... 2008 1 0301236

(51) Int. Cl.
*H04B 1/08* (2006.01)
*H04M 1/00* (2006.01)

(52) U.S. Cl. ................. 455/575.1; 455/90.3; 455/550.1; 455/575.8

(58) Field of Classification Search ............... 455/575.1, 455/575.8, 90.3, 550.1, 348, 349; 361/679.01, 361/679.56; 429/97; 379/419, 428.01
See application file for complete search history.

(56) References Cited

U.S. PATENT DOCUMENTS

| | | | |
|---|---|---|---|
| 5,955,700 A * | 9/1999 | Slipy et al. | 174/50 |
| 6,463,263 B1 * | 10/2002 | Feilner et al. | 455/90.1 |
| 6,525,928 B1 * | 2/2003 | Madsen et al. | 361/679.56 |
| 7,647,079 B2 * | 1/2010 | Zuo et al. | 455/575.1 |
| 2002/0131584 A1 * | 9/2002 | Mote et al. | 379/419 |
| 2005/0130721 A1 * | 6/2005 | Gartrell | 455/575.8 |
| 2005/0136995 A1 * | 6/2005 | Robertson | 455/575.1 |
| 2010/0062323 A1 * | 3/2010 | Dong et al. | 429/96 |
| 2010/0130268 A1 * | 5/2010 | Huang et al. | 455/575.1 |

FOREIGN PATENT DOCUMENTS

CN    1223476 A    7/1999

* cited by examiner

*Primary Examiner* — Pablo N Tran
*(74) Attorney, Agent, or Firm* — Steven M. Reiss

(57) ABSTRACT

A battery cover latching mechanism (20) used in a portable electronic device is described including a cover member (22) and a latch base (21). The latch base includes a first guiding rail (24) and a latching projection (218). The latch base defines a sliding groove (217) adjacent to the first guiding rail. The cover member can slide relative to the latch base and includes a second guiding rail (25) and a latching portion (23). The second guiding rail engages the first guiding rail. The latching portion is slidably received in the sliding groove. The first guiding rail guides the second guiding rail to slide along the guiding rail. The latching portion slides within the sliding groove and then latched by the latching projection.

19 Claims, 6 Drawing Sheets

BATTERY COVER LATCH MECHANISM AND PORTABLE ELECTRONIC DEVICE USING SAME

BACKGROUND

1. Field of the Invention

The invention relates to battery cover latch mechanisms used in portable electronic devices.

2. Description of Related Art

Portable electronic devices usually include latch mechanisms for latching battery covers to housings. The latch mechanisms must tolerate frequent installation and removal of batteries relative to the housing.

A typical battery cover latch mechanism includes a battery cover and a housing. The battery cover may slide relative to and then latch with the housing by a sliding-type structure. However, the battery cover is typically completely removed from the housing for installation or removal of the battery. Thus, the loss of the battery cover after removal can be a risk.

Therefore, there is room for improvement within the art.

BRIEF DESCRIPTION OF THE DRAWINGS

Many aspects of the exemplary battery cover latch mechanism and an exemplary portable electronic device using the battery cover latch mechanism can be better understood with reference to the following drawings. These drawings are not necessarily drawn to scale, the emphasis instead being placed upon clearly illustrating the principles of the exemplary battery cover latch mechanism and the portable electronic device. Moreover, in the drawings like reference numerals designate corresponding parts throughout the several views. Wherever possible, the same reference numbers are used throughout the drawings to refer to the same or like elements of an embodiment.

DETAILED DESCRIPTION OF THE EXEMPLARY EMBODIMENTS

Figure 1:
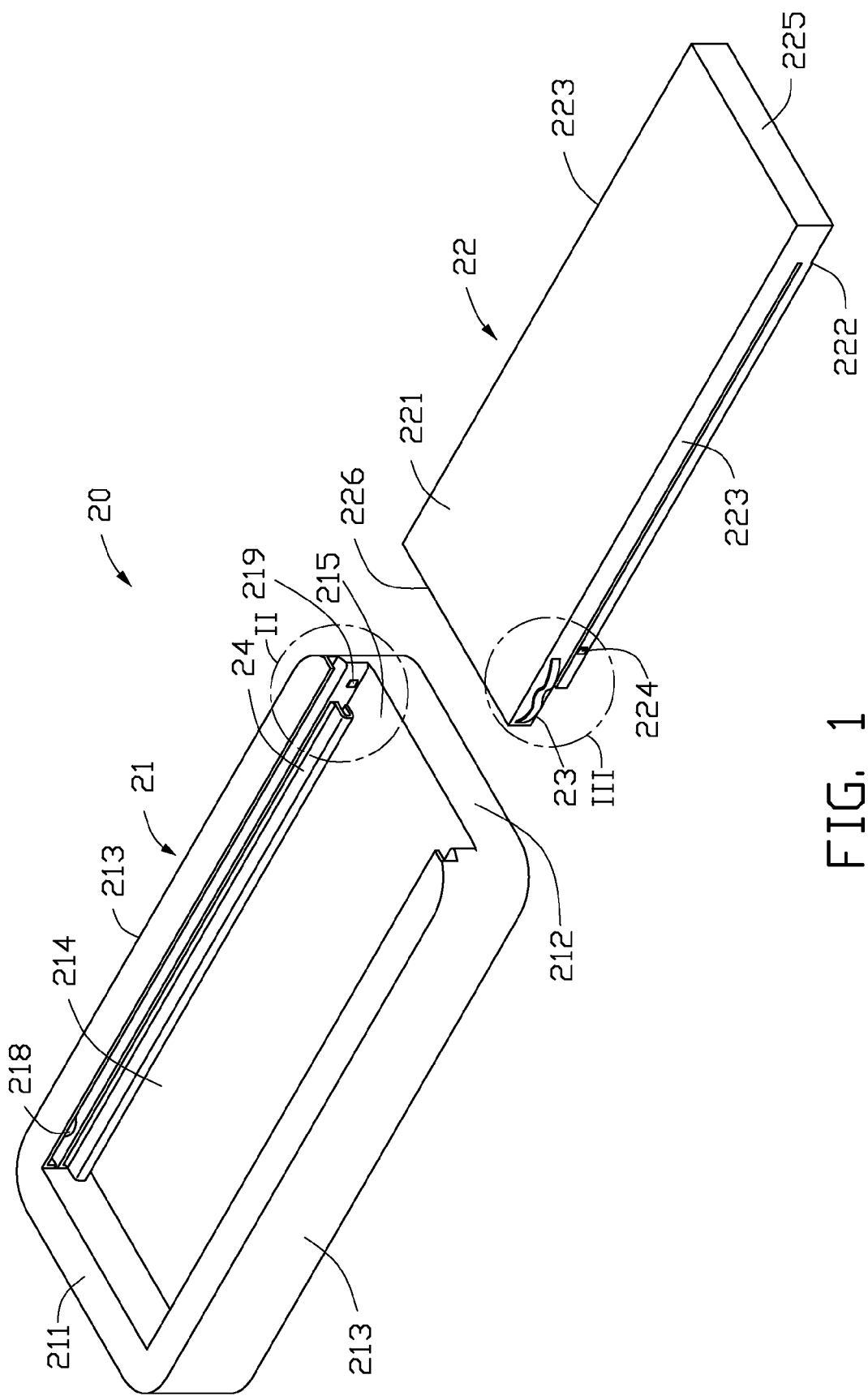
FIG. 1 is an isometric and exploded view of a battery cover latching mechanism according to the exemplary embodiment.

FIG. 1 shows a battery cover latch mechanism 20 for a portable electronic device (such as a mobile phone). The battery cover latch mechanism 20 includes a latch base 21 and a cover member 22. The cover member 22 can slide along and latch to the latch base 21. The cover member 22 can be a battery cover of the portable electronic device. The latch base 21 can be a housing of the portable electronic device.

Figure 2:
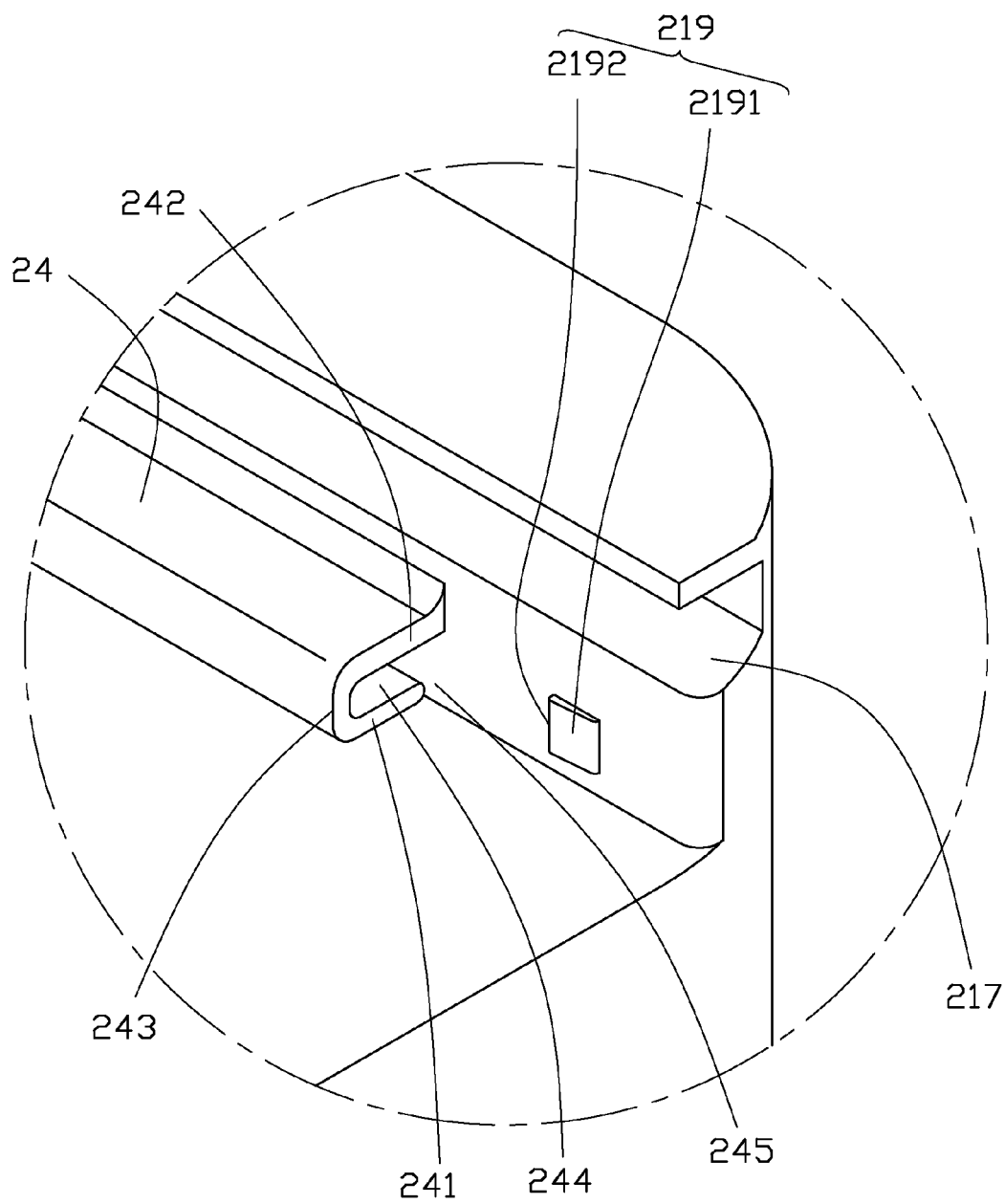
FIG. 2 is an enlarged view of II-section of FIG. 1.

The latch base 21 defines a chamber 214 enclosed by an end wall 211, a bottom wall 212 and two opposite sidewalls 213. The chamber 214 can be used to receive a battery (not shown). The chamber 214 has an opening 215 defined in one side of latch base 21 opposite to the end wall 211. Referring to FIGS. 1 and 2, each sidewall 213 defines a sliding groove 217 having a latching projection 218 (see FIG. 6) projecting from an end of the sliding groove 217 adjacent to the end wall 211. The sidewalls 213 include two retaining protrusions 219 and two guiding rails 24 projecting toward a center of the chamber 214. The retaining protrusions 219 are adjacent to the bottom wall 212 between the guiding rails 24 and the opening 215. The retaining protrusions 219 are generally wedge-shaped including two guiding walls 2191 and two retaining walls 2192 perpendicularly connecting with the guiding walls 2191.

Referring to FIG. 2, the guiding rails 24 are between the top wall 211 and the bottom wall 212, and extend along the sidewalls 213. Each guiding rail 24 has a generally U-shaped first guiding groove 244 defined by a first bottom flange 241, a first top flange 242, and a first connecting flange 243. The first connecting flange 243 connects the first bottom and top flanges 241 and 242. The first top flange 242 directly extends from the sidewall 213 toward the center of the chamber 214. A first guiding gap 245 is defined between the first bottom flange 241 and the sidewall 213.

Figure 3:
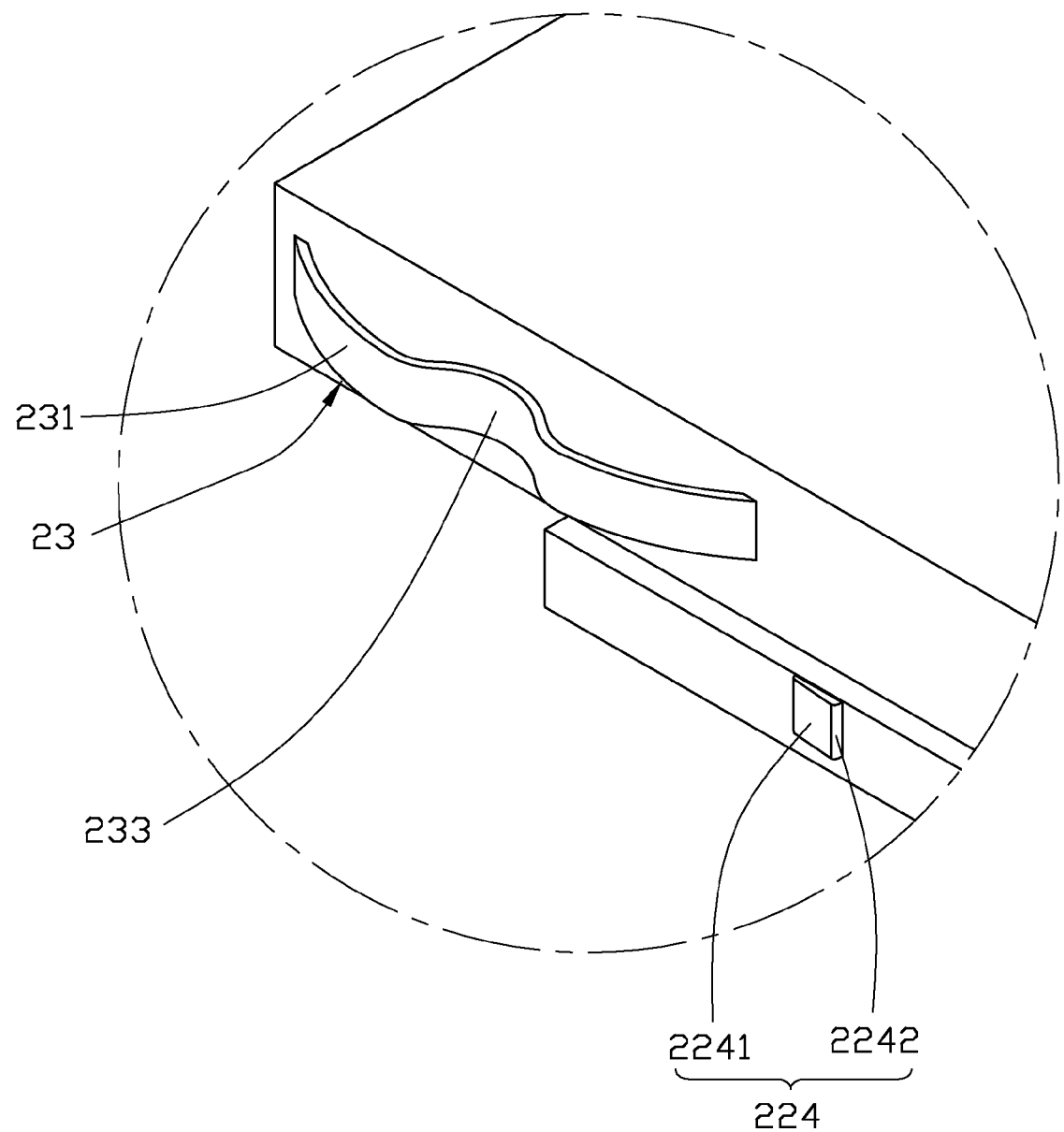
FIG. 3 is an enlarged view of III-section of FIG. 1.
Figure 4:
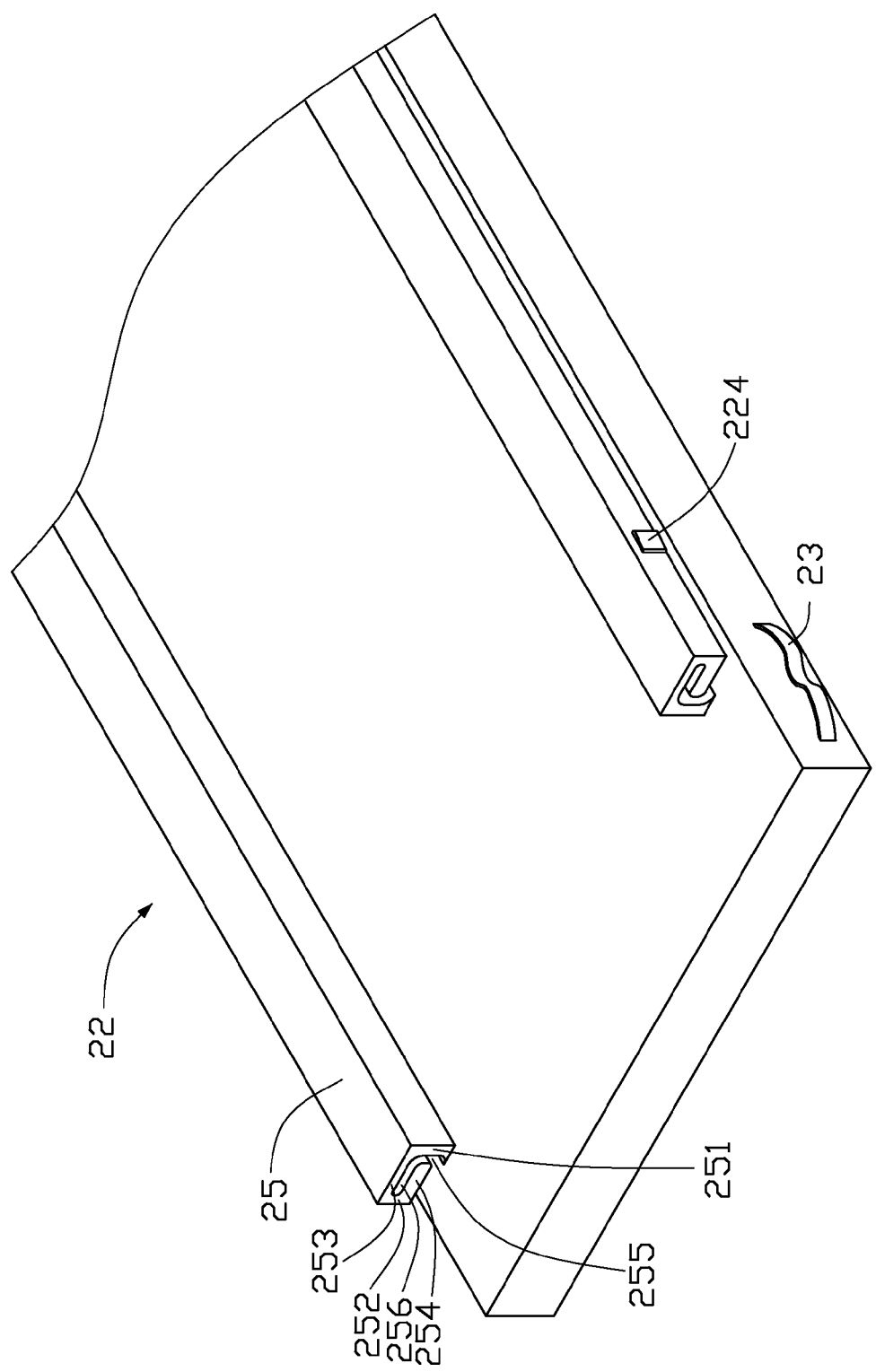
FIG. 4 is a partial and isometric view of a cover member shown in FIG. 1.

Referring to FIG. 1, the cover member 22 have two latching portions 23 extending (e.g., co-molding) outwardly on two opposite sides, and two second guiding rails 25 protruding from another side (seen in FIG. 4). Each of the second guiding rails 25 has a retaining projection 224 protruding outwardly on a side (seen in FIG. 4). The two retaining projections 244 are opposite each other. Referring to FIG. 3, the retaining projections 224 correspond to the retaining protrusions 219 and are generally wedge-shaped including two sliding walls 2241 and two limiting walls 2242. Each of the limiting walls 2242 perpendicularly connects the corresponding sliding wall 2241. The sliding walls 2241 are configured to slide along and then pass the guiding walls 2191. The limiting walls 2242 can resist against the retaining walls 2192 sliding wall. Each latching portion 23 is a wave-shaped elastic sheet including, for example, two convex portions 231 and a concave portion 233. The concave portion 233 can be positioned between the two symmetrical convex portions 231.

Referring to FIG. 4, the two second guiding rails 25 correspond to the two guiding rails 24 having similar structures. The two second guiding rails 25 include two extending portions 251, two second bottom flanges 254 similar to the first bottom flanges 241, two second top portions 253 similar to the first top flanges 242, and two second connecting portions 252 similar to the first connecting flanges 243. Each of the two second guiding rails 25 defines a second guiding groove 256 enclosed by the second side, top and bottoms portions 252, 253 and 254, and a second guiding gap 255 between the second bottom portion 254 and the top surface of the cover member 22.

Figure 5:
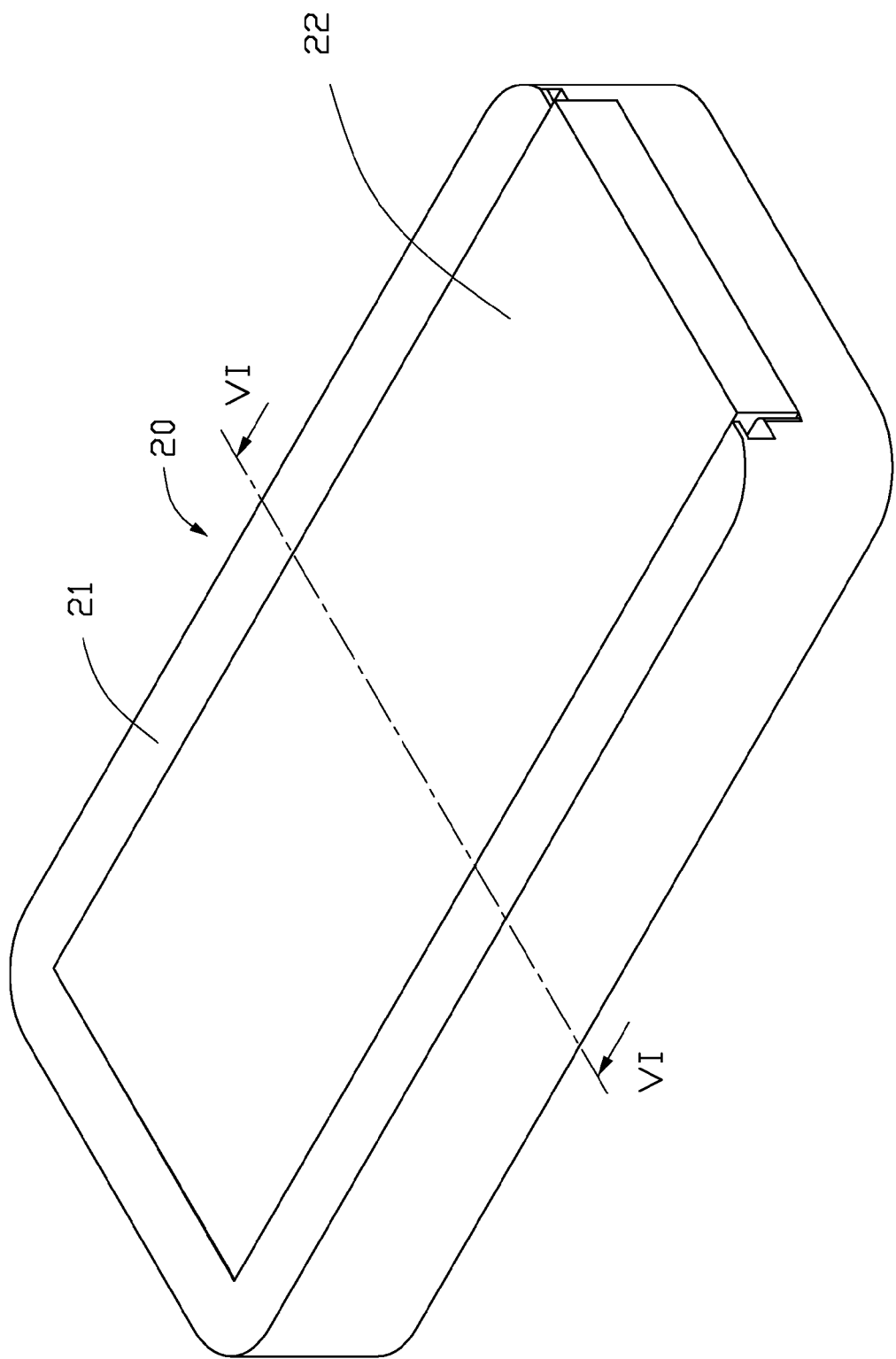
FIG. 5 is an isometric view of the battery cover latching mechanism of FIG. 1 at a latched state.
Figure 6:
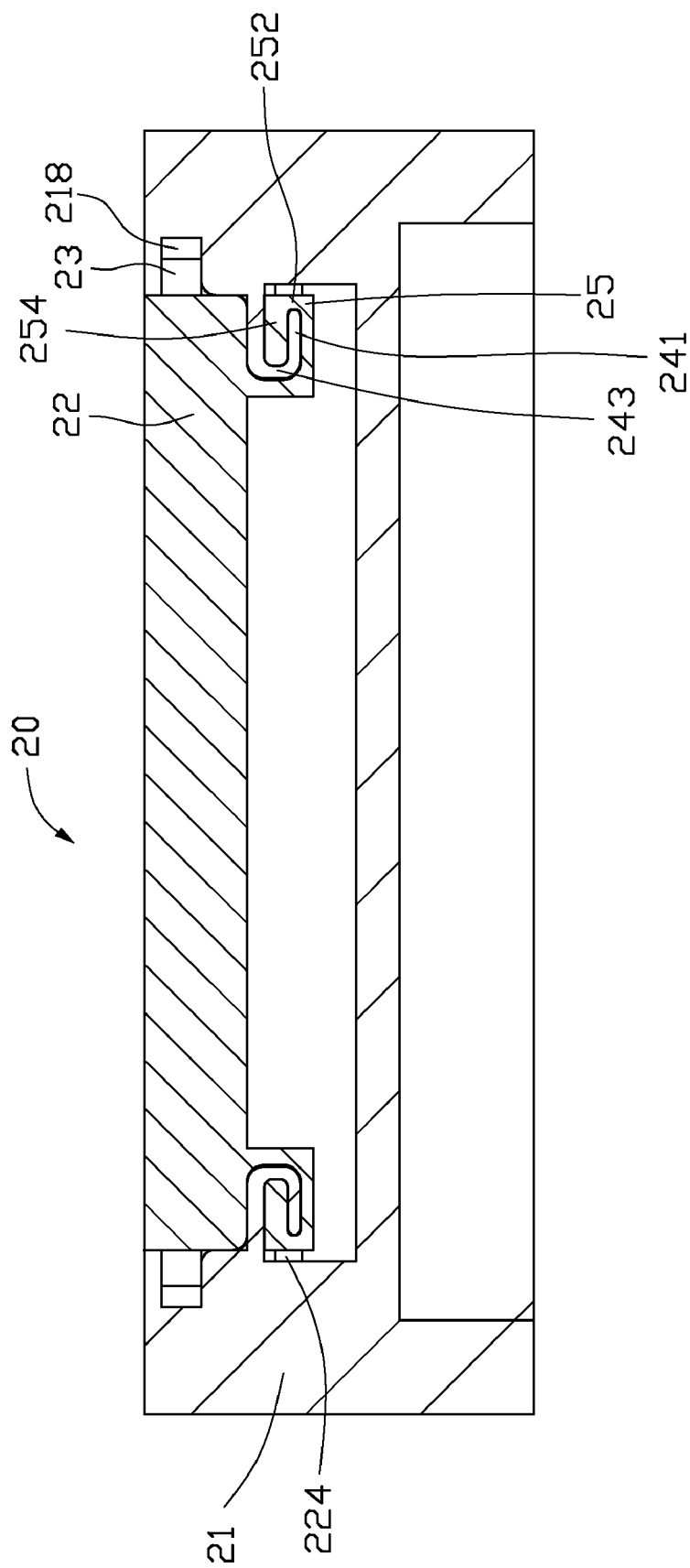
FIG. 6 is a sectional view of the battery cover latching mechanism shown in FIG. 5.

Referring to FIGS. 3, 5 and 6, the battery cover latch mechanism 20 is in the latching position. The cover member 22 latches to the latch base 21 by the two latching projections 218 received and secured in the concave portions 233. Each latching portion 23 is slidably received in the corresponding sliding grooves 217. At this time, the first guiding rails 24 slidably engage the second guiding rails 25. The first bottom flanges 241 slidably engage into the second guiding grooves 256. The first connecting flanges 243 slidably engage into the second guiding gaps 255. The second bottom flanges 254 engage into the first guiding grooves 244. The second side portions 252 slidably engage into the first guiding gaps 245.

To release the battery cover latch mechanism 20 from the latching state, the cover member 22 may be pushed to slide along the latch base 21. As the cover member 22 is slid, the latching portion 23 slides relative to the latching projections 218, and latching projections 218 slides from the bottom of the concave portions 233 to the top of the convex portions 231. During this stage, the second guiding rails 25 slide along the guiding rails 24. The elastic latching portions 23 are compressed by the latching projections 218 and accumulate an elastic force. The accumulated elastic force releases and ejects the latching projections 218 from the convex portion 231. The cover member 22 can now freely slide along the latch base 21. In this case, the first bottom flanges 241 can slide freely within the second guiding grooves 256. The first connecting flanges 243 can slide freely within the second guiding gaps 255. The second bottom flanges 254 can slide freely within the first guiding grooves 244. The second side portions 252 can slide freely within the first guiding gaps 245.

Additionally, the cover member 22 cannot be completely removed from the latch base 21 due to the interaction of the retaining walls 2192 with the limiting walls 2242.

It is to be understood, however, that even through numerous characteristics and advantages of the exemplary invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A battery cover latching mechanism, comprising:
    a latch base comprising a first guiding rail, a sliding groove adjacent to the first guiding rail, and a latching projection in the sliding groove; and
    a cover member configured for sliding relative to the latch base, comprising a second guiding rail and a latching portion, the second guiding rail engaging the first guiding rail, the latching portion slidably received in the sliding groove;
    wherein when the cover member slides relative to the latch base, the first guiding rail guides a second guiding rail to slide therealong, the latching portion slides within the sliding groove and is configured to be latched with the latching projection.

2. The battery cover latching mechanism as claimed in claim 1, wherein the latch base further comprises a retaining protrusion, and the cover member comprises a retaining projection, the retaining protrusion and the retaining projection prevent the cover member being completely removed from the latch base.

3. The battery cover latching mechanism as claimed in claim 2, wherein the latch base defines an opening for inserting the cover member therefrom, the retaining protrusion located adjacent to the opening.

4. The battery cover latching mechanism as claimed in claim 3, wherein the retaining projection is arranged on the second guiding rail.

5. The battery cover latching mechanism as claimed in claim 3, wherein the retaining protrusion comprises a guiding wall and a retaining wall, the retaining projection comprises a sliding wall and a limiting wall, the sliding wall is configured to be guided by the guiding wall, the limiting wall is configured to be retained with the retaining wall.

6. The battery cover latching mechanism as claimed in claim 1, wherein the latching portion is an elastic wave-shaped sheet comprising two convex portions and a concave portion between the convex portions, and the latching projection is configured to be latched in the concave portion.

7. The battery cover latching mechanism as claimed in claim 1, wherein the first guiding rail and the second guiding rail have similar structures.

8. The battery cover latching mechanism as claimed in claim 7, wherein:

the first guiding rail and the second guiding rail are generally U-shaped;
the first guiding rail comprises first guiding portions and defines first guiding spaces; and
the second guiding rail comprises second guiding portions and defines second guiding spaces, the second guiding portions slidably engaging into the first guiding spaces, the first guiding portions slidably engaging into the second guided spaces.

9. The battery cover latching mechanism as claimed in claim 8, wherein:
the first guiding portions includes a first bottom flange, a first top flange, and a first connecting flange; and
the first guiding spaces includes a first guiding groove and the first guiding gap;
wherein the first connecting flange connects the parallel first and first top flanges, the first guiding gap communicates with the first guiding groove, the first guiding gap is located between the latch base and the first bottom flange, and the first guiding groove is defined by the first, second and first connecting flanges.

10. The battery cover latching mechanism as claimed in claim 9, wherein:
the second guiding portions comprise a second bottom flange similar to the first bottom flanges, a second top portion similar to the first top flange, and a second side portion similar to the first connecting flange; and
the second guiding spaces comprise a second guiding groove defined by the second bottom, top and connecting flanges, and a second guiding gap defined by the second bottom flange and the cover member.

11. The battery cover latching mechanism as claimed in claim 10, wherein:
the first bottom flange is configured to engage with and slide freely within the second guiding grooves;
the first connecting flanges are configured to engage with and slide freely within the second guiding gap;
the second bottom flange is configured to engage with and slide freely within the first guiding groove; and
the second side portions is configured to engage with and slide freely within the first guiding gap.

12. A portable electronic device, comprising:
a housing comprising a first guiding rail, defining a sliding groove adjacent to the first guiding rail, and projecting a latching projection in the sliding groove; and
a battery cover configured for sliding relative to the housing, comprising a second guiding rail and a latching portion, the second guiding rail engaging the first guiding rail, the latching portion slidably received in the sliding groove;
wherein when the battery cover slides relative to the housing, the first guiding rail guides a second guiding rail to slide therealong, the latching portion slides within the sliding groove and configured to be latched with the latching projection.

13. The portable electronic device as claimed in claim 12, wherein the housing further comprises a retaining protrusion, and the battery cover comprises a retaining projection, the retaining protrusion and the retaining projection prevent the battery cover being completely removed from the housing.

14. The portable electronic device as claimed in claim 13, wherein the retaining protrusion comprises a guiding wall and a retaining wall, the retaining projection comprises a sliding wall and a limiting wall, the sliding wall is configured to be guided by the guiding wall, the limiting wall is configured to be retained with the retaining wall.

15. The portable electronic device as claimed in claim 12, wherein the latching portion is an elastic wave-shaped sheet comprising two convex portions and a concave portion between the convex portions, and the latching protrusion is configured to be latched in the concave portion.

16. The portable electronic device as claimed in claim 15, wherein:
- the first guiding rail and the second guiding rail are generally U-shaped;
- the first guiding rail comprises first guiding portions and defines first guiding spaces; and
- the second guiding rail comprises second guiding portions and defines second guiding spaces, the second guiding portions slidably engaging into the first guiding spaces, the first guiding portions slidably engaging into the second guided spaces.

17. The portable electronic device as claimed in claim 16, wherein:
- the first guiding portions includes a first bottom flange, a first top flange, and a first connecting flange; and
- the first guiding spaces includes a first guiding groove and the first guiding gap;
- wherein the first connecting flange connects the parallel first and first top flanges, the first guiding gap communicates with the first guiding groove, the first guiding gap is located between the housing and the first bottom flange, and the first guiding groove is defined by the first, second and first connecting flanges.

18. The portable electronic device as claimed in claim 17, wherein:
- the second guiding portions comprise a second bottom flange similar to the first bottom flanges, a second top portion similar to the first top flange, and a second side portion similar to the first connecting flange; and
- the second guiding spaces comprise a second guiding groove defined by the second bottom, top and connecting flanges, and a second guiding gap defined by the second bottom flange and the battery cover.

19. The portable electronic device as claimed in claim 18, wherein:
- the first bottom flange is configured to engage with and slide freely within the second guiding grooves;
- the first connecting flanges are configured to engage with and slide freely within the second guiding gap;
- the second bottom flange is configured to engage with and slide freely within the first guiding groove; and
- the second side portions is configured to engage with and slide freely within the first guiding gap.

* * * * *